(12) United States Patent
Belcea (10) Patent No.: US 7,076,259 B2
(45) Date of Patent: Jul. 11, 2006

(54) REAL-TIME SYSTEM AND METHOD FOR IMPROVING THE ACCURACY OF THE COMPUTED LOCATION OF MOBILE SUBSCRIBERS IN A WIRELESS AD-HOC NETWORK USING A LOW SPEED CENTRAL PROCESSING UNIT

(75) Inventor: John M. Belcea, West Melbourne, FL (US)

(73) Assignee: MeshNetworks, Inc., Maitland, FL (US)

( * ) Notice: Subject to any disclaimer, the term of this patent is extended or adjusted under 35 U.S.C. 154(b) by 0 days.

(21) Appl. No.: 10/799,090

(22) Filed: Mar. 12, 2004

(65) Prior Publication Data
US 2005/0186966 A1    Aug. 25, 2005

Related U.S. Application Data

(60) Provisional application No. 60/453,965, filed on Mar. 13, 2003.

(51) Int. Cl.
*H04B 7/20* (2006.01)

(52) U.S. Cl. .............. 455/458.1; 455/456.1; 455/456.6; 342/357.06; 702/1

(58) Field of Classification Search .. 455/456.1–456.6, 455/404.2, 424–425, 550.1, 560; 340/457, 340/450, 357.1; 370/332, 338; 701/200, 701/300; 342/357.06, 450, 357.01
See application file for complete search history.

(56) References Cited

U.S. PATENT DOCUMENTS

| | | | |
|---|---|---|---|
| 4,494,192 A | 1/1985 | Lew et al. | |
| 4,617,656 A | 10/1986 | Kobayashi et al. | |
| 4,736,371 A | 4/1988 | Tejima et al. | |
| 4,742,357 A | 5/1988 | Rackley | |
| 4,747,130 A | 5/1988 | Ho | |
| 4,910,521 A | 3/1990 | Mellon | |
| 5,034,961 A | 7/1991 | Adams | |
| 5,068,916 A | 11/1991 | Harrison et al. | |
| 5,231,634 A | 7/1993 | Giles et al. | |
| 5,233,604 A | 8/1993 | Ahmadi et al. | |
| 5,241,542 A | 8/1993 | Natarajan et al. | |
| 5,317,566 A | 5/1994 | Joshi | |
| 5,392,450 A | 2/1995 | Nossen | |
| 5,412,654 A | 5/1995 | Perkins | |
| 5,424,747 A | 6/1995 | Chazelas | |

(Continued)

FOREIGN PATENT DOCUMENTS

CA    2132180    3/1996

(Continued)

OTHER PUBLICATIONS

Wong, et al., "Soft Handoffs in CDMA Mobile Systems," Dec. 1997, IEEE Personal Communications.

(Continued)

*Primary Examiner*—Joseph Feild
*Assistant Examiner*—Kamran Afshar
(74) *Attorney, Agent, or Firm*—Randi L. Karpinia; Joseph J. Buczynski (57) ABSTRACT

A system and method for improving the accuracy in computing the location of a mobile subscriber device connected in a wireless network. The system and method employ a predictive filter, including a measurement weight algorithm to decrease standard deviation error, to correctly determine a location of a mobile subscriber device. The predictive filter requires lower levels of computation, which allows for real-time processing on low-speed central processing units commonly used in wireless networks.

21 Claims, 5 Drawing Sheets

U.S. PATENT DOCUMENTS

| | | | |
|---|---|---|---|
| 5,502,722 A | 3/1996 | Fulghum | |
| 5,517,491 A | 5/1996 | Nanni et al. | |
| 5,555,425 A | 9/1996 | Zeller et al. | |
| 5,555,540 A | 9/1996 | Radke | |
| 5,572,528 A | 11/1996 | Shuen | |
| 5,583,774 A * | 12/1996 | Diesel | 701/200 |
| 5,615,212 A | 3/1997 | Ruszczyk et al. | |
| 5,618,045 A | 4/1997 | Kagan et al. | |
| 5,621,732 A | 4/1997 | Osawa | |
| 5,623,495 A | 4/1997 | Eng et al. | |
| 5,627,976 A | 5/1997 | McFarland et al. | |
| 5,631,897 A | 5/1997 | Pacheco et al. | |
| 5,644,576 A | 7/1997 | Bauchot et al. | |
| 5,652,751 A | 7/1997 | Sharony | |
| 5,680,392 A | 10/1997 | Semaan | |
| 5,684,794 A | 11/1997 | Lopez et al. | |
| 5,687,194 A | 11/1997 | Paneth et al. | |
| 5,696,903 A | 12/1997 | Mahany | |
| 5,701,294 A | 12/1997 | Ward et al. | |
| 5,706,428 A | 1/1998 | Boer et al. | |
| 5,717,689 A | 2/1998 | Ayanoglu | |
| 5,745,483 A | 4/1998 | Nakagawa et al. | |
| 5,774,876 A | 6/1998 | Wooley et al. | |
| 5,781,540 A | 7/1998 | Malcolm et al. | |
| 5,787,080 A | 7/1998 | Hulyalkar et al. | |
| 5,794,154 A | 8/1998 | Bar-On et al. | |
| 5,796,732 A | 8/1998 | Mazzola et al. | |
| 5,796,741 A | 8/1998 | Saito et al. | |
| 5,805,593 A | 9/1998 | Busche | |
| 5,805,842 A | 9/1998 | Nagaraj et al. | |
| 5,805,977 A | 9/1998 | Hill et al. | |
| 5,809,518 A | 9/1998 | Lee | |
| 5,822,309 A | 10/1998 | Ayanoglu et al. | |
| 5,844,905 A | 12/1998 | McKay et al. | |
| 5,845,097 A | 12/1998 | Kang et al. | |
| 5,857,084 A | 1/1999 | Klein | |
| 5,870,350 A | 2/1999 | Bertin et al. | |
| 5,877,724 A | 3/1999 | Davis | |
| 5,881,095 A | 3/1999 | Cadd | |
| 5,881,372 A | 3/1999 | Kruys | |
| 5,886,992 A | 3/1999 | Raatikainen et al. | |
| 5,896,561 A | 4/1999 | Schrader et al. | |
| 5,903,559 A | 5/1999 | Acharya et al. | |
| 5,909,651 A | 6/1999 | Chander et al. | |
| 5,936,953 A | 8/1999 | Simmons | |
| 5,943,322 A | 8/1999 | Mayer et al. | |
| 5,987,011 A | 11/1999 | Toh | |
| 5,987,033 A | 11/1999 | Boer et al. | |
| 5,991,279 A | 11/1999 | Haugli et al. | |
| 6,028,853 A | 2/2000 | Haartsen | |
| 6,029,217 A | 2/2000 | Arimilli et al. | |
| 6,034,542 A | 3/2000 | Ridgeway | |
| 6,044,062 A | 3/2000 | Brownrigg et al. | |
| 6,047,330 A | 4/2000 | Stracke, Jr. | |
| 6,052,594 A | 4/2000 | Chuang et al. | |
| 6,052,752 A | 4/2000 | Kwon | |
| 6,064,626 A | 5/2000 | Stevens | |
| 6,067,291 A | 5/2000 | Kamerman et al. | |
| 6,067,297 A | 5/2000 | Beach | |
| 6,078,566 A | 6/2000 | Kikinis | |
| 6,104,712 A | 8/2000 | Robert et al. | |
| 6,108,738 A | 8/2000 | Chambers et al. | |
| 6,115,580 A | 9/2000 | Chuprun et al. | |
| 6,122,690 A | 9/2000 | Nannetti et al. | |
| 6,130,881 A | 10/2000 | Stiller et al. | |
| 6,132,306 A | 10/2000 | Trompower | |
| 6,147,975 A | 11/2000 | Bowman-Amuah | |
| 6,163,699 A | 12/2000 | Naor et al. | |
| 6,166,685 A * | 12/2000 | Soliman | 342/357.1 |
| 6,178,337 B1 | 1/2001 | Spartz et al. | |
| 6,192,053 B1 | 2/2001 | Angelico et al. | |
| 6,192,230 B1 | 2/2001 | Van Bokhorst et al. | |
| 6,208,870 B1 | 3/2001 | Lorello et al. | |
| 6,222,463 B1 | 4/2001 | Rai | |
| 6,222,504 B1 | 4/2001 | Oby | |
| 6,223,240 B1 | 4/2001 | Odenwald et al. | |
| 6,240,294 B1 | 5/2001 | Hamilton et al. | |
| 6,246,875 B1 | 6/2001 | Seaholtz et al. | |
| 6,249,516 B1 | 6/2001 | Brownrigg et al. | |
| 6,275,707 B1 | 8/2001 | Reed et al. | |
| 6,285,892 B1 | 9/2001 | Hulyalkar | |
| 6,304,556 B1 | 10/2001 | Haas | |
| 6,327,300 B1 | 12/2001 | Souissi et al. | |
| 6,330,446 B1 * | 12/2001 | Mori | 455/435.2 |
| 6,349,091 B1 | 2/2002 | Li | |
| 6,349,210 B1 | 2/2002 | Li | |
| 6,359,872 B1 | 3/2002 | Mahany et al. | |
| 6,366,568 B1 | 4/2002 | Bolgiano et al. | |
| 6,405,049 B1 | 6/2002 | Herrod et al. | |
| 6,519,464 B1 * | 2/2003 | Santhoff et al. | 455/456.5 |
| 6,594,238 B1 * | 7/2003 | Wallentin et al. | 370/341 |
| 6,625,135 B1 * | 9/2003 | Johnson et al. | 455/456.1 |
| 6,826,162 B1 * | 11/2004 | Haines et al. | 455/456.1 |
| 6,919,842 B1 * | 7/2005 | Cho | 342/357.06 |
| 2001/0053699 A1 | 12/2001 | McCrady et al. | |
| 2002/0013856 A1 | 1/2002 | Garcia-Luna-Aceves | |
| 2002/0016173 A1 * | 2/2002 | Hunzinger | 455/456 |
| 2002/0163901 A1 * | 11/2002 | Spratt | 370/338 |
| 2004/0203905 A1 * | 10/2004 | Cuffaro | 455/456.1 |
| 2005/0181810 A1 * | 8/2005 | Camp et al. | 455/456.6 |
| 2005/0228589 A1 * | 10/2005 | Diggelen et al. | 702/1 |

FOREIGN PATENT DOCUMENTS

| | | |
|---|---|---|
| EP | 0513841 A2 | 11/1992 |
| EP | 0627827 A2 | 12/1994 |
| EP | 0924890 A2 | 6/1999 |
| FR | 2683326 | 7/1993 |
| WO | WO 9608884 | 3/1996 |
| WO | WO 9724005 | 7/1997 |
| WO | WO 9839936 | 9/1998 |
| WO | WO 9912302 | 3/1999 |
| WO | WO 0034932 | 6/2000 |
| WO | WO 0110154 | 2/2001 |
| WO | WO 0133770 | 5/2001 |
| WO | WO 0135567 | 5/2001 |
| WO | WO 0137481 | 5/2001 |
| WO | WO 0137482 | 5/2001 |
| WO | WO 0137483 | 5/2001 |
| WO | WO 0235253 | 5/2002 |
| WO | WO 03/107595 A1 | 12/2003 |

OTHER PUBLICATIONS

Wong et al., "A Pattern Recognition System for Handoff Algorithms," Jul. 2000, IEEE Journal on Selected Areas in Communications, vol. 18, No. 7.

Andras G. Valko, "Cellular IP: A New Approach to Internet Host Mobility," Jan. 1999, ACM Computer Communication Review.

Richard North, Dale Bryan and Dennis Baker, "Wireless Networked Radios: Comparison of Military, Commercial and R&D Protocols," Feb. 28-Mar. 3, 1999, 2nd Annual UCSD Conference on Wireless Communications, San Diego, CA.

Benjamin B. Peterson, Chris Kmiecik, Richard Hartnett, Patrick M. Thompson, Jose Mendoza and Hung Nguyen, "Spread Spectrum Indoor Geolocation," Aug. 1998, Navigation: Journal of the Institute of Navigation, vol. 45, No. 2, Summer 1998.

Josh Broch, David A. Maltz, David B. Johnson, Yih-Chun Hu and Jorjeta Jetcheva, "A Performance Comparison of Multi-Hop Wireless Ad Hoc Network Routing Protocols,"

Oct. 25-30, 1998, Proceedings of the 4th Annual ACM/IEEE International Conference on Mobile Computing and Networking.

C. David Young, "USAP: A Unifying Dynamic Distributed Multichannel TDMA Slot Assignment Protocol".

Chip Elliott and Bob Heile, "Self-Organizing, Self-Healing Wireless Networks," 2000 IEEE.

J.J. Garcia-Luna-Aceves and Asimakis Tzamaloukas, "Reversing the Collision-Avoidance Handshake in Wireless Networks".

J.J. Garcia-Luna-Aceves and Marcelo Spohn, "Transmission-Efficient Routing in Wireless Networks Using Link-State Information".

J.J. Garcia-Luna-Aceves and Ewerton L. Madruga, "The Core-Assisted Mesh Protocol," Aug. 1999, IEEE Journal on Selected Areas in Communications, vol. 17, No. 8.

Ad Kamerman and Guido Aben, "Net Throughput with IEEE 802.11 Wireless LANs".

J. R. McChesney and R.J. Saulitis, "Optimization of an Adaptive Link Control Protocol for Multimedia Packet Radio Networks".

Ram Ramanathan and Regina Rosales-Hain, "Topology Control of Multihop Wireless Networks Using Transmit Power Adjustment".

Ram Ramanathan and Martha E. Steenstrup, "Hierarchically-Organized, Multihop Mobile Wireless Networks for Quality-of-Service Support".

Martha E. Steenstrup, "Dynamic Multipoint Virtual Circuits for Multimedia Traffic in Multihop Mobile Wireless Networks".

Zhenya Tang and J.J. Garcia-Luna-Aceves, "Collision-Avoidance Transmission Scheduling for Ad-Hoc Networks".

George Vardakas and Wendell Kishaba, "QoS Networking With Adaptive Link Control and Tactical Multi-Channel Software Radios".

Neal Patwai, Relative Location Estimation in Wireless Sensor Network, IEEE Transaction on Signal Processing, Nov. 8, 2001, vol. 51. pp. 2137-2146.

* cited by examiner

REAL-TIME SYSTEM AND METHOD FOR IMPROVING THE ACCURACY OF THE COMPUTED LOCATION OF MOBILE SUBSCRIBERS IN A WIRELESS AD-HOC NETWORK USING A LOW SPEED CENTRAL PROCESSING UNIT

The present invention claims benefit under 35 U.S.C. § 119(e) from U.S. Provisional Patent Application Ser. No. 60/453,965 of John M. Belcea, filed on Mar. 13, 2003, the entire content of which is incorporated herein by reference.

BACKGROUND OF THE INVENTION

1. Field of the Invention

The present invention relates to a system and method for accurately computing the location of a mobile subscriber device connected in a wireless network. More particularly, the present invention relates to the use of a predictive filter, including a measurement weight algorithm to decrease standard deviation error, to more correctly determine the location of a mobile subscriber.

2. Description of the Related Art

Wireless communications networks, such as mobile wireless telephone networks, have become increasingly prevalent over the past decade. These wireless communications networks are commonly referred to as "cellular networks", because the network infrastructure is arranged to divide the service area into a plurality of regions called "cells". A terrestrial cellular network includes a plurality of interconnected base stations, or base nodes, that are distributed geographically at designated locations throughout the service area. Each base node includes one or more transceivers that are capable of transmitting and receiving electromagnetic signals, such as radio frequency (RF) communications signals, to and from mobile user nodes, such as wireless telephones, located within the coverage area. The communications signals include, for example, voice data that has been modulated according to a desired modulation technique and transmitted as data packets. As can be appreciated by one skilled in the art, network nodes transmit and receive data packet communications in a multiplexed format, such as time-division multiple access (TDMA) format, code-division multiple access (CDMA) format, or frequency-division multiple access (FDMA) format, which enables a single transceiver at the base node to communicate simultaneously with several mobile nodes in its coverage area.

In recent years, a type of mobile communications network known as an "ad-hoc" network has been developed to address the needs of multiple mobile device communication beyond traditional infrastructure coverage. In this type of network, each user terminal (hereinafter "mobile node") is capable of operating as a base station or router for other mobile nodes within the network, thus eliminating the need for a fixed infrastructure of base stations. Accordingly, data packets being sent from a source mobile node to a destination mobile node are typically routed through a number of intermediate mobile nodes before reaching the destination node.

More sophisticated ad-hoc networks are also being developed which, in addition to enabling mobile nodes to communicate with each other as in conventional ad-hoc networks, further enable the mobile nodes to access fixed networks and communicate with other types of user terminals, such as those on the public switched telephone network (PSTN) and the Internet. Details of these advanced types of ad-hoc networks are described in U.S. patent application Ser. No. 09/897,790 entitled "Ad Hoc Peer-to-Peer Mobile Radio Access System Interfaced to the PSTN and Cellular Networks", filed on Jun. 29, 2001, in U.S. patent application Ser. No. 09/815,157 entitled "Time Division Protocol for an Ad-Hoc, Peer-to-Peer Radio Network Having Coordinating Channel Access to Shared Parallel Data Channels with Separate Reservation Channel", filed on Mar. 22, 2001, in U.S. patent application Ser. No. 09/815,164 entitled "Prioritized-Routing for an Ad-Hoc, Peer-to-Peer, Mobile Radio Access System", filed on Mar. 22, 2001, in U.S. patent application Ser. No. 09/988,001 entitled "A System and Method for Computing the Location of a Mobile Terminal in a Wireless Communications Network", filed on Nov. 16, 2001, and in U.S. Pat. Nos. 6,453,168 and 6,665,333, the entire content of each being incorporated herein by reference.

The mobile nodes of such networks may assume any number of random positions within the network, making exact node location determinations when needed difficult. For computing node geographical coordinates in such ad-hoc wireless networks, algorithms in use at individual nodes in typical networks use the "Time Of Arrival" (TOA) measurement technique. As can be appreciated by one skilled in the art, a TOA measurement provides the distance between mobile nodes and wireless routers, which are used as references, for computing the mobile node position. The measurements are based upon signal propagation times, specifically the time a signal needs for traveling at the speed of light between a mobile node and fixed stations.

Due to various propagation factors, the modem that makes the TOA measurement does not receive direct signals all the time, but may also receive a number of secondary signals. Such modems, through the use of antennas and associated signal processing, serve to transmit and receive various data packets with the assistance of specific supporting elements in the physical layer, such as modulation, coding, and framing, and also the MAC and radio resource management layers. Each includes an apparatus to estimate position and velocity using either the Time Of Arrival (TOA) of signals received by the modem, their Phase Of Arrival (POA), their Strength Of Arrival (SOA), their Frequency Of Arrival (FOA), or a combination of such techniques.

Since secondary signals are reflections of the direct signal, each secondary signal travels a longer distance and therefore has a longer transmission path. In most cases, the measurement modem can identify and separate direct signals from secondary signals, and provide a correct propagation time. However, in some cases the direct signal may be too weak when compared with reflected signals to accomplish this. In such cases, the modem is not able to determine the correct propagation time.

The precision of range measurement in indoor areas, or in areas with very tall buildings, is often very poor due to propagation conditions specific for these types of environments. As a result, typical methods for computing the location of a mobile terminal based on propagation ranges measured in "urban canyons" or inside buildings produce very inaccurate results.

Several systems and methods can be used to improve the precision of the computation of mobile terminal position calculations within environments, such as a city, and inside buildings. For example, these systems and methods can consider information obtained from a large number of references (routers) on which to base the computation. These systems and methods can also increase their sampling frequency, and/or implement predictive filters to attempt to improve location accuracy.

In order to reach the required level of precision, these systems and methods need to sacrifice other services. For example, systems and methods that use more than four reference points (e.g., terminals) or frequent sampling to perform these types of "location services" operations require additional bandwidth and processing time. Since bandwidth is limited, implementing this technique will result in a decrease in the bandwidth available for other services provided by the wireless network. The situation can be somewhat improved by considering a more efficient protocol for performing the time-of-flight (TOF) query on the signals transmitted to and from the reference points. However, tests show that increasing the number of reference points to more than eight does not provide substantial improvement of accuracy. Increasing the sampling frequency for range measurement also requires more bandwidth that is thus made unavailable for other services.

As an alternative to increasing the number of reference points or sampling frequency, it is possible to implement a predictive filter to improve the accuracy of location services operations performed inside buildings. Accordingly, a need exists for a system and method to implement a predictive filter to improve the precision of mobile terminal position calculations within certain environments, such as in a city and inside a building.

SUMMARY OF THE INVENTION

An object of the present invention is to provide a system and method for improving the accuracy of computing the location of a mobile subscriber device connected in a wireless network employed in certain environments, such as in a city or inside a building.

Another object of the present invention is to provide a system and method for providing a predictive filter that can be implemented as a linear model of subscriber device movement and can include a weight algorithm to reduce effects of non-current position data, to thus increase the accuracy in computing the location of a subscriber device.

Another object of the present invention is to provide a system and method for providing a predictive filter that includes an algorithm to decrease standard deviation error, to thus increase the accuracy in computing the location of a subscriber device.

Another object of the present invention is to provide a system and method for providing a predictive filter that requires lower level computation which allows for real-time processing on low-speed central processing units (CPUs) commonly employed in devices operating in wireless networks.

Another object of the present invention is to provide a system and method for using a predictive filter that can be implemented in hardware or software on a CPU of a mobile terminal, on a host CPU, or on a remote server.

These and other objects are substantially achieved by providing a system and method for using a predictive filter to correctly determine the position of a subscriber device where typical propagation range measurement techniques are subject to errors. The predictive filter is implemented as a liner model of subscriber device movement and determines subscriber device position using computed subscriber device movement characteristics. The filter includes a weight factor algorithm to reduce effects of erroneous data and a "forget" factor which reduces the weight of older data in position calculations, thus allowing for real-time processing on low speed central processing units.

Specifically, the above and other objects are substantially achieved by a system and method for determining a location of a mobile communication device in a communication network, in particular, a wireless ad-hoc peer-to-peer communication network. The system and method perform the operations of estimating a location of the mobile communication device based on measured data representing respective distances between the mobile communication device and a plurality of reference points, and modifying the estimated location, using a predictive filter including a forget factor which treats older measured data less significantly than newer measured data in estimating the location, to generate a modified estimated location representative of the location of the mobile communication device. The forget factor can have a value between 0 and 1. The modifying operation predicts movement of the mobile communication device on three axes of coordinates and uses the predictive filter to adjust the predicted movement to ascertain the modified estimated location.

More particularly, the modifying operation predicts the movement using equations including variables representing the starting position of the mobile communication device and variables representing the moving speed of the mobile communication device, as modified by the predictive filter. The equations include three systems of equations, each system pertaining to a respective axis of movement and employing the forget factor to adjust the estimated starting position coordinate for that respective axis and speed of movement along that respective axis.

BRIEF DESCRIPTION OF THE DRAWINGS

These and other objects, advantages and novel features of the invention will be more readily appreciated from the following detailed description when read in conjunction with the accompanying drawings, in which.

DETAILED DESCRIPTION OF THE PREFERRED EMBODIMENTS

The system and method described below implements a predictive filter to improve the quality of location services operations performed in an ad-hoc network. In particular, the system and method employing the filter operates to compute locations of a mobile subscriber device connected in a wireless network, and is adapted to improve performance even under adverse conditions typically present during network operations inside and around obstructions, such as buildings. The filter can be implemented on a central processing unit (CPU) of a mobile subscriber device. The filter can also be employed on a host CPU, or on a remote server, which typically have more available CPU time.

As discussed above, when the propagation of radio waves is subject to interference due to, for example, the presence of obstructions such as wall or buildings, the correct value of the distance between a mobile subscriber device and fixed references cannot be correctly evaluated. In such conditions, the relative location of the mobile subscriber device with respect to fixed references is computed with very large errors. The system and method according to the embodiments of the invention described below improves the quality of location services operations to substantially increase the precision of the computed location of a mobile subscriber device.

Figure 1:
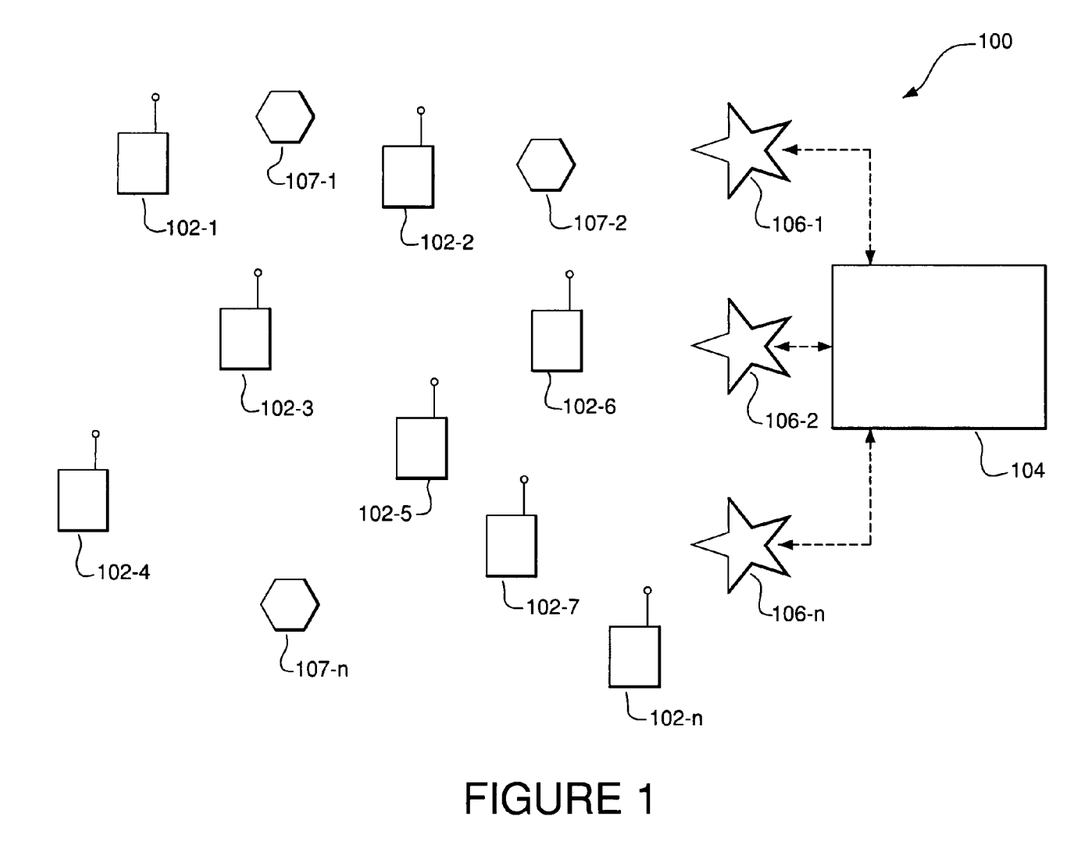
FIG. 1 is a block diagram of an example of an ad-hoc wireless communications network including a plurality of nodes employing an embodiment of the present invention.

FIG. 1 is a block diagram illustrating an example of an ad-hoc packet-switched wireless communications network 100 employing an embodiment of the present invention. Specifically, the network 100 includes a plurality of mobile wireless user terminals 102-1 through 102-n (referred to generally as nodes 102, mobile nodes 102 or subscriber devices), and can, but is not required to, include a fixed network 104 having a plurality of access points 106-1, 106-2, . . . 106-n (referred to generally as nodes 106 or access points 106), for providing subscriber devices 102 with access to the fixed network 104. The fixed network 104 can include, for example, a core local access network (LAN), and a plurality of servers and gateway routers, to provide network nodes with access to other networks, such as other ad-hoc networks, the public switched telephone network (PSTN) and the Internet. The network 100 further can include a plurality of fixed routers 107-1 through 107-n (referred to generally as nodes 107, fixed routers 107, or wireless routers 107) for routing data packets between other nodes 102, 106 or 107. Because they are not mobile, routers 107 are preferred for use as reference nodes for mobile node position measurements. It is noted that for purposes of this discussion, the nodes discussed above can be collectively referred to as "nodes 102, 106 and 107", or simply "nodes".

As can be appreciated by one skilled in the art, the nodes 102, 106 and 107 are capable of communicating with each other directly, or via one or more other nodes 102, 106 or 107 operating as a router or routers for packets being sent between nodes, as described in U.S. Pat. No. 5,943,322 to Mayor, which is incorporated herein by reference, and in U.S. patent application Ser. Nos. 09/897,790, 09/815,157 and 09/815,164 which are referenced above.

Figure 2:
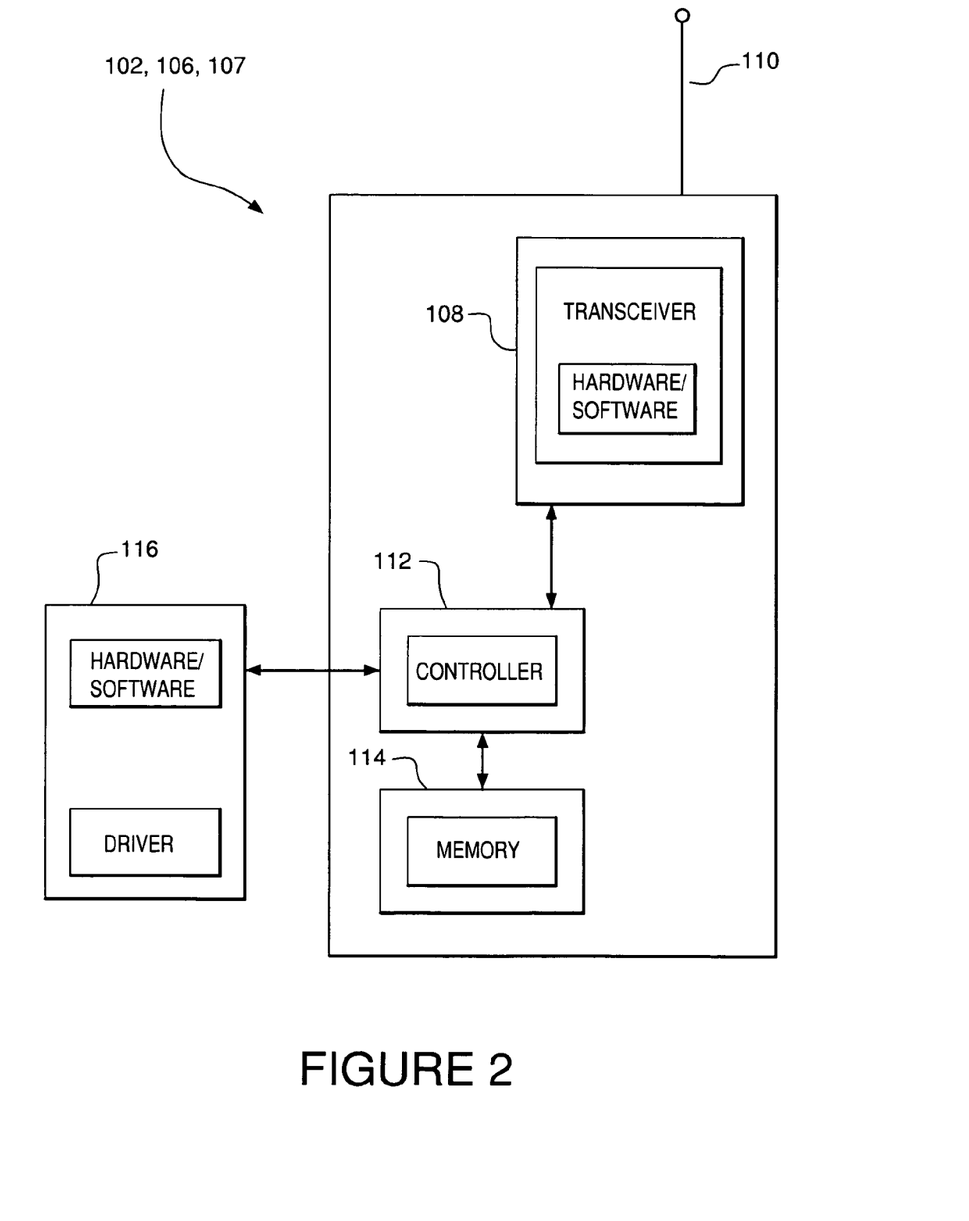
FIG. 2 is a block diagram of an example of a wireless node, or subscriber device, as shown in FIG. 1.

As shown in FIG. 2, each node 102, 106 and 107 has a transceiver including a transmitter and a receiver, which collectively can be referred to as a modem 108. As shown in FIG. 2, each node 102, 106 and 107 includes a modem 108 which is coupled to an antenna 110 and is capable of receiving and transmitting signals, such as packetized signals, to and from other nodes 102, 106 and 107, under the control of a controller 112. The packetized data signals can include, for example, voice, data or multimedia information, and packetized control signals, including node update information.

Each node 102, 106 and 107 further includes a memory 114, such as a random access memory (RAM), that is capable of storing, among other things, routing information pertaining to itself and other nodes in the network 100. The nodes 102, 106 and 107 exchange their respective routing information, referred to as routing advertisements or routing table information, with each other via a broadcasting mechanism periodically, for example, when a new node enters the network 100, or when existing nodes in the network 100 move.

As further shown in FIG. 2, certain nodes, especially mobile nodes 102, can include a host 116 which may consist of any number of devices, such as a notebook computer terminal, mobile telephone unit, mobile data unit, or any other suitable device. Each node 102, 106 and 107 also includes the appropriate hardware and software to perform Internet Protocol (IP) and Address Resolution Protocol (ARP), the purposes of which can be readily appreciated by one skilled in the art. The appropriate hardware and software to perform transmission control protocol (TCP) and user datagram protocol (UDP) may also be included.

The modem 108 of each node also includes the capability to identify, differentiate and measure the arrival time of signals received at a node 102, 106 and 107, both via direct paths and reflected paths, from other nodes of the network. Algorithms in use at each node can use a "Time Of Arrival" (TOA) measurement technique as known to those skilled in the art, and may provide the distance between nodes for computing individual node positions. The measurements are based upon signal propagation times, specifically, the time a signal needs for traveling at the speed of light between a mobile node and fixed node, used as a reference.

As can be appreciated by those skilled in the art, the measurement of direct path signal arrival times is useful for identifying and measuring distances between nodes, such as between a subscriber device 102 and a wireless router 107. The precision of this distance measurement has a direct impact on the accuracy of the geographical position determination of the mobile node as computed by a device, such as a "location service" module.

As shown in FIGS. 1 and 2, each node 102, 106 and 107 has the capability to distinguish and identify signals received via a direct path from signals received via a reflected path. However, such identification of direct path signals is very difficult or almost impossible when adverse conditions prevent one node from communicating with another node in a direct path. For example, the communication between two nodes located in a building with concrete floors is often subject to signal reflection, as well as diffraction and diffusion via objects located inside and outside the building. In these environments, the signals received via reflected paths could be much stronger than the signals received via the direct path, since the direct signal may be attenuated by passing through concrete floors or objects which absorb the signal. Unfortunately, such large level differences between the direct and secondary or reflected signals make the identification of the direct signal almost impossible in some cases. Furthermore, when a mobile node enters a temporary "shadow" of an obstruction, it can communicate with other nodes only through reflected signals. Although such communication does not dramatically affect the quality of data transferred in the network, the measurement of direct signal arrival time for use in distance measurements becomes impossible. Although historical data may be used to provide a distance estimate, the estimated accuracy will rely heavily upon the accuracy of the historical data maintained at the node, which may or may not be reliable.

As noted above, when the propagation of radio waves is subjected to interference, the correct value of the distance between a mobile subscriber device and fixed references cannot be correctly evaluated. In such conditions, the relative location of the mobile subscriber device with respect to fixed references is computed with very large errors. However, as will now be described, the use of a predictive filter according to an embodiment of the present invention greatly improves the quality of location services operations, thus substantially increasing the precision of the computed position of a subscriber device.

A predictive filter can be implemented in hardware or software on a mobile node, or subscriber device central processing unit (CPU), to assist in the computation of locations of a subscriber device connected in a wireless network. In the examples presented below, the subscriber device can move inside buildings or in densely populated areas at very slow speeds. To correctly find the position of the subscriber device inside a building, a model of the subscriber device movement is considered.

One example of the filter in accordance with an embodiment of the present invention employs a linear model, or algorithm, of the movement of the subscriber device as shown in equation set (1), where the projections of the movement on the three axes of coordinates are independent. In equation set (1), all values except the time t, are unknown. The estimate of the real position (x', y', z') of the subscriber device is computed from a starting at point $(x_0, y_0, z_0)$ and assumes that the mobile moves at constant speed $(V_x, V_y, V_z)$.

$$x' = x_0 + V_x * t$$
$$y' = y_0 + V_y * t$$
$$z' = z_0 + V_z * t \quad (1)$$

The location services operations use current range estimate to provide positions (x, y, z) that are affected by errors as shown below in equation set (2).

$$x = x' + \epsilon_x$$
$$y = y' + \epsilon_y$$
$$z = z' + \epsilon_z \quad (2)$$

Equation set (2) shows the relationship between the computed position of the mobile terminal (x, y, z) and the real position (x', y', z'). In the example, if the errors $(\epsilon_x, \epsilon_y, \epsilon_z)$ are randomly distributed, three systems of equations can be written as shown below in equation set (3).

$$\begin{cases} \sum_{i=1}^{n} x_i = x_0 \sum_{i=1}^{n} 1 + V_x * \sum_{i=1}^{n} t_i \\ \sum_{i=1}^{n} t_i x_i = x_0 \sum_{i=1}^{n} t_i + V_x * \sum_{i=1}^{n} t_i^2 \end{cases} \quad (3)$$

$$\begin{cases} \sum_{i=1}^{n} y_i = y_0 \sum_{i=1}^{n} 1 + V_y * \sum_{i=1}^{n} t_i \\ \sum_{i=1}^{n} t_i y_i = y_0 \sum_{i=1}^{n} t_i + V_y * \sum_{i=1}^{n} t_i^2 \end{cases}$$

$$\begin{cases} \sum_{i=1}^{n} z_i = z_0 \sum_{i=1}^{n} 1 + V_z * \sum_{i=1}^{n} t_i \\ \sum_{i=1}^{n} t_i z_i = z_0 \sum_{i=1}^{n} t_i + V_z * \sum_{i=1}^{n} t_i^2 \end{cases}$$

Since all equations of equation set (3) are affected by random errors, the system of equation set (3) can be solved with a Least Squares Method (LSM), and thereafter compute the starting point $(x_0, y_0, z_0)$ and the moving speed $(V_x, V_y, V_z)$ of the mobile terminal. The matrices associated with these systems of equations are computed using $(x_i, y_i, z_i)$ provided by the location service operations at time $t_1, t_2, \ldots t_n$.

If the subscriber device in this example moves uniformly in one direction, the system of equation set (3) provides a perfect description of the movement. In reality, the subscriber device typically must change direction, speed, or both. In such cases, past data that has been collected is no longer current, and can decrease the accuracy of results.

To address this concern, the factor $\Phi^{n-i}$ can be used as a weight of each measurement, where $0 < \Phi < 1$. Because the value of $\Phi^{n-i}$ is very small for large n−i, the factor can be used to weight each measurement, so the filter algorithm "forgets" very old measurements. For this reason, $\Phi$ is called the "forget" factor. The effect of using the forget factor is similar, but not identical, with using a sliding window of size $1/(1-\Phi)$.

The system of equations presented in equation set (3) can be rewritten using the forget factor as shown below in equation set (4).

$$\begin{cases} \sum_{i=1}^{n} \varphi^{n-i} x_i = x_0 \sum_{i=1}^{n} \varphi^{n-i} + V_x * \sum_{i=1}^{n} \varphi^{n-i} t_i \\ \sum_{i=1}^{n} \varphi^{n-i} t_i x_i = x_0 \sum_{i=1}^{n} \varphi^{n-i} t_i + V_x * \sum_{i=1}^{n} \varphi^{n-i} t_i^2 \end{cases} \quad (4)$$

$$\begin{cases} \sum_{i=1}^{n} \varphi^{n-i} y_i = y_0 \sum_{i=1}^{n} \varphi^{n-i} + V_y * \sum_{i=1}^{n} \varphi^{n-i} t_i \\ \sum_{i=1}^{n} \varphi^{n-i} t_i y_i = y_0 \sum_{i=1}^{n} \varphi^{n-i} t_i + V_y * \sum_{i=1}^{n} \varphi^{n-i} t_i^2 \end{cases}$$

$$\begin{cases} \sum_{i=1}^{n} \varphi^{n-i} z_i = z_0 \sum_{i=1}^{n} \varphi^{n-i} + V_z * \sum_{i=1}^{n} \varphi^{n-i} t_i \\ \sum_{i=1}^{n} \varphi^{n-i} t_i z_i = z_0 \sum_{i=1}^{n} \varphi^{n-i} t_i + V_z * \sum_{i=1}^{n} \varphi^{n-i} t_i^2 \end{cases}$$

All three systems of equations have exactly the same main matrix. In this example, the shorthand notations $a_{1,1}^{(n)}$, $a_{1,2}^{(n)}$, $a_{2,1}^{(n)}$, $a_{2,2}^{(n)}$ can be used for the elements of the main matrix. The upper index (n) shows the step of the process when the element is computed. Similarly, for these three systems of equations, the right terms are $bx_1^{(n)}$, $bx_2^{(n)}$, $by_1^{(n)}$, $by_2^{(n)}$, $bz_1^{(n)}$ and $bz_2^{(n)}$, and can now be written as equation set (5).

$$a_{1,1}^{(n)} = \sum_{i=1}^{n} \varphi^{n-i} = 1 + \varphi \sum_{i=1}^{n-1} \varphi^{n-i} = 1 + \varphi a_{1,1}^{(n-1)} \quad (5)$$

$$a_{1,1}^{(n)} = a_{2,1}^{(n)} = \sum_{i=1}^{n} \varphi^{n-i} t_i = t_n + \varphi \sum_{i=1}^{n-1} \varphi^{n-i} t_i = t_n + \varphi a_{1,2}^{(n-1)}$$

$$a_{2,2}^{(n)} = \sum_{i=1}^{n} \varphi^{n-i} t_i^2 = t_n^2 + \varphi \sum_{i=1}^{n-1} \varphi^{n-i} t_i^2 = t_n^2 + \varphi a_{2,2}^{(n-1)}$$

$$bx_1^{(n)} = \sum_{i=1}^{n} \varphi^{n-i} x_i' = x_n' + \varphi \sum_{i=1}^{n-1} \varphi^{n-1-i} x_i' = x_n' + \varphi bx_1^{(n-1)}$$

$$bx_2^{(n)} = \sum_{i=1}^{n} \varphi^{n-i} t_i x_i' = t_i x_n' + \varphi \sum_{i=1}^{n} \varphi^{n-i} t_i x_i' = t_n x_n' + \varphi bx_2^{(n-1)}$$

$$by_1^{(n)} = \sum_{i=1}^{n} \varphi^{n-i} y_i' = y_n' + \varphi \sum_{i=1}^{n-1} \varphi^{n-1-i} y_i' = y_n' + \varphi by_1^{(n-1)}$$

-continued $$by_2^{(n)} = \sum_{i=1}^{n} \varphi^{n-i} t_i y_i' = t_i y_i' + \varphi \sum_{i=1}^{n} \varphi^{n-i} t_i y_i' = t_n y_n' + \varphi by_2^{(n-1)}$$

$$bz_1^{(n)} = \sum_{i=1}^{n} \varphi^{n-i} z_i' = z_n' + \varphi \sum_{i=1}^{n-1} \varphi^{n-1-i} z_i' = z_n' + \varphi bz_1^{(n-1)}$$

$$bz_2^{(n)} = \sum_{i=1}^{n} \varphi^{n-i} t_i z_i' = t_i z_i' + \varphi \sum_{i=1}^{n} \varphi^{n-i} t_i z_i' = t_n z_n' + \varphi bz_2^{(n-1)}$$

The equation set (5) shown above illustrates how the main matrix and the right hand terms can be computed from the previously computed values using an iterative method. This method is useful because it eliminates the need for storing old data when updating matrix elements and reduce the amount of computation.

The elements of the subscriber device movement are then computed as shown in equation set (6).

$$\Delta^{(n)} = a_{1,1}^{(n)} a_{2,2}^{(n)} - (a_{1,2}^{(n)})^2 \quad (6)$$

$$x_0^{(n)} = \frac{bx_1^{(n)} a_{2,2}^{(n)} - bx_2^{(n)} a_{1,2}^{(n)}}{\Delta^{(n)}}$$

$$V_x^{(n)} = \frac{a_{1,1}^{(n)} bx_2^{(n)} - a_{1,2}^{(n)} bx_1^{(n)}}{\Delta^{(n)}}$$

$$y_0^{(n)} = \frac{by_1^{(n)} a_{2,2}^{(n)} - by_2^{(n)} a_{1,2}^{(n)}}{\Delta^{(n)}}$$

$$V_y^{(n)} = \frac{a_{1,1}^{(n)} by_2^{(n)} - a_{1,2}^{(n)} by_1^{(n)}}{\Delta^{(n)}}$$

$$z_0^{(n)} = \frac{bz_1^{(n)} a_{2,2}^{(n)} - bz_2^{(n)} a_{1,2}^{(n)}}{\Delta^{(n)}}$$

$$V_z^{(n)} = \frac{a_{1,1}^{(n)} bz_2^{(n)} - a_{1,2}^{(n)} bz_1^{(n)}}{\Delta^{(n)}}$$

The filter provides all parameters needed for computing a smooth current position and for predicting the mobile position in the future for the subscriber device.

The quality of the computed prediction with the filter presented in equations (1) through (6) depends on previously collected data and the size of the forget factor $\phi$. Usually the factor has a value very close to one (0.99 for example). The use of a KFilter in accordance with the embodiment of the present invention adds still more accuracy to the system and method of prediction described above.

The KFilter filtering method described below includes aspects of "Kalman filtering" as known to those skilled in the art, but is different in many aspects. One significant difference is the reduced amount of computation required in the embodiment of the present invention compared with Kalman filters. This allows the use of the KFilter of the present embodiment for real-time processing on low speed CPU devices. (The use of letter K in the name of the filter is as recognition to Kalman teaching about filtering methods).

Each individual position generated by location services operations for a mobile node is typically affected by random errors. Sometimes these errors are large or small, depending on the nature of the radio frequency (RF) propagation inside buildings and in and around dense areas and cannot be controlled. The example of a KFilter presented below computes an individual weight for each measurement generated by the subscriber device. The weight of the measurement is computed with the purpose of decreasing the standard deviation of errors from one measurement to the next. Although the purpose is to continuously decrease the standard deviation of errors, the variation of the standard deviation remains strongly dependent on the accuracy of the input data.

To decrease the standard deviation of errors from one measurement to the next, the KFilter first computes the error $\epsilon'^{(n)}$ using the time and location provided by the mobile node or subscriber device, and previously computed movement characteristics of the subscriber device, such as the reference point $(x_0, y_0, z_0)$ and the moving speed $(V_x, V_y, V_z)$ as shown in equation set (7).

$$\varepsilon_x'^{(n)} = x^{(n)} - (x_0^{(n-1)} + V_x^{(n-1)} t_n) \quad (7)$$

$$\varepsilon_y'^{(n)} = y^{(n)} - (y_0^{(n-1)} + V_y^{(n-1)} t_n)$$

$$\varepsilon_z'^{(n)} = z^{(n)} - (z_0^{(n-1)} + V_z^{(n-1)} t_n)$$

$$\sigma'^{(n)} = \sqrt{\frac{S^{(n-1)} + (\varepsilon_x'^{(n)})^2 + (\varepsilon_y'^{(n)})^2 + (\varepsilon_z'^{(n)})^2}{a_{1,1}^{(n-1)} + 1}}$$

The computation of term $s^{n-1}$ is described below. The weight factor $w^{(n)}$ of the current measurement is computed as shown in equation set (8) from the previous standard deviation, and the new measurement errors $\epsilon'_x{}^{(n)}$, $\epsilon'_y{}^{(n)}$ and $\epsilon'_z{}^{(n)}$ calculated from equation set (7).

$$w' = K\left(\frac{\sigma^{(n-1)}}{\sigma'^{(n)}} - 1\right) + 1 \quad (8)$$

$$w = \begin{cases} w' > \text{Max} \Rightarrow \text{Max} \\ w' < \text{Min} \Rightarrow \text{Min} \\ w' > \text{Min} \wedge w' < \text{Max} \Rightarrow w' \end{cases}$$

The value of K in equation set (8) is always positive, is selected based on the specific application, and provides the "sensitivity" of the KFilter to variations of the input data. The Min and Max values are positive and serve to limit the variation of the computed weight factor w.

Equation (8) provides a weighting factor w that must assure the successive minimization of the standard deviation $\sigma$. In this equation $\sigma'^{(n)}$ was computed with equation (7) and is the predicted value of the standard deviation if the new measurement would be considered with weight w=1. Such presumption can be correct or not. If $\sigma'^{(n)}$ is smaller than the previous value of the standard deviation $\sigma^{(n-1)}$, $\sigma^{(n-1)}/\sigma'^{(n)}$ is larger than one and then we get a weight value larger than one. If $\sigma'^{(n)}$ is larger than the previous value of the standard deviation $\sigma^{(n-1)}$, $\sigma^{(n-1)}/\sigma'^{(n)}$ is smaller than one and then we get a weight value smaller than one. The value of K allows adjusting the sensitivity of the weighting process according to the needs of the specific application.

The computed weight factor w is then used for building the system of equation set (9).

$$a_{1,1}^{(n)} = w^{(n)} + \varphi a_{1,1}^{(n-1)} \quad (9)$$

$$a_{1,2}^{(n)} = w^{(n)} t_n + \varphi a_{1,2}^{(n-1)}$$

$$a_{2,2}^{(n)} = w^{(n)} t_n^2 + \varphi a_{2,2}^{(n-1)}$$

-continued $$bx_1^{(n)} = w^{(n)} x_n' + \varphi bx_1^{(n-1)}$$

$$bx_2^{(n)} = w^{(n)} t_n x_n' + \varphi bx_2^{(n-1)}$$

$$by_1^{(n)} = w^{(n)} y_n' + \varphi by_1^{(n-1)}$$

$$by_2^{(n)} = w^{(n)} t_n y_n' + \varphi by_2^{(n-1)}$$

$$bz_1^{(n)} = w^{(n)} z_n' + \varphi bz_1^{(n-1)}$$

$$bz_2^{(n)} = w^{(n)} t_n z_{n_i}' + \varphi bz_2^{(n-1)}$$

The a and b values from equation set (9) are used as described for equation set (6) to compute the new values of the reference point ($x_0$, $y_0$, $z_0$) and the moving speed ($V_x$, $V_y$, $V_z$). The value of the standard deviation is then updated as shown in equation set (10).

$$\varepsilon_x^{(n)} = x^{(n)} - (x_0^{(n)} + V_x^{(n)} t_n) \quad (10)$$

$$\varepsilon_y^{(n)} = y^{(n)} - (y_0^{(n)} + V_y^{(n)} t_n)$$

$$\varepsilon_x^{(n)} = z^{(n)} - (z_0^{(n)} + V_z^{(n)} t_n)$$

$$\varepsilon^{(n)} = \sqrt{(\varepsilon_x^{(n)})^2 + (\varepsilon_y^{(n)})^2 + (\varepsilon_z^{(n)})^2}$$

$$S^{(n)} = (\varepsilon^{(n)})^2 w^{(n)} + \varphi s^{n-1}$$

$$\sigma^{(n)} = \sqrt{\frac{s^{(n)}}{a_{1,1}^{(n)}}}$$

The standard deviation $\sigma^{(n)}$ is not known a priori, therefore equations (7) and (8) cannot be applied when the first few measurements are made. For this reason, the first several samples are considered as correct and weighted with w=1. As described for equations (5) and (10), some terms are computed recursively using their values from previous iteration. Since the computation shows additive operations, it is normal that initial values of all variables computed iteratively are equal to zero when the filter is first started.

Figure 3:
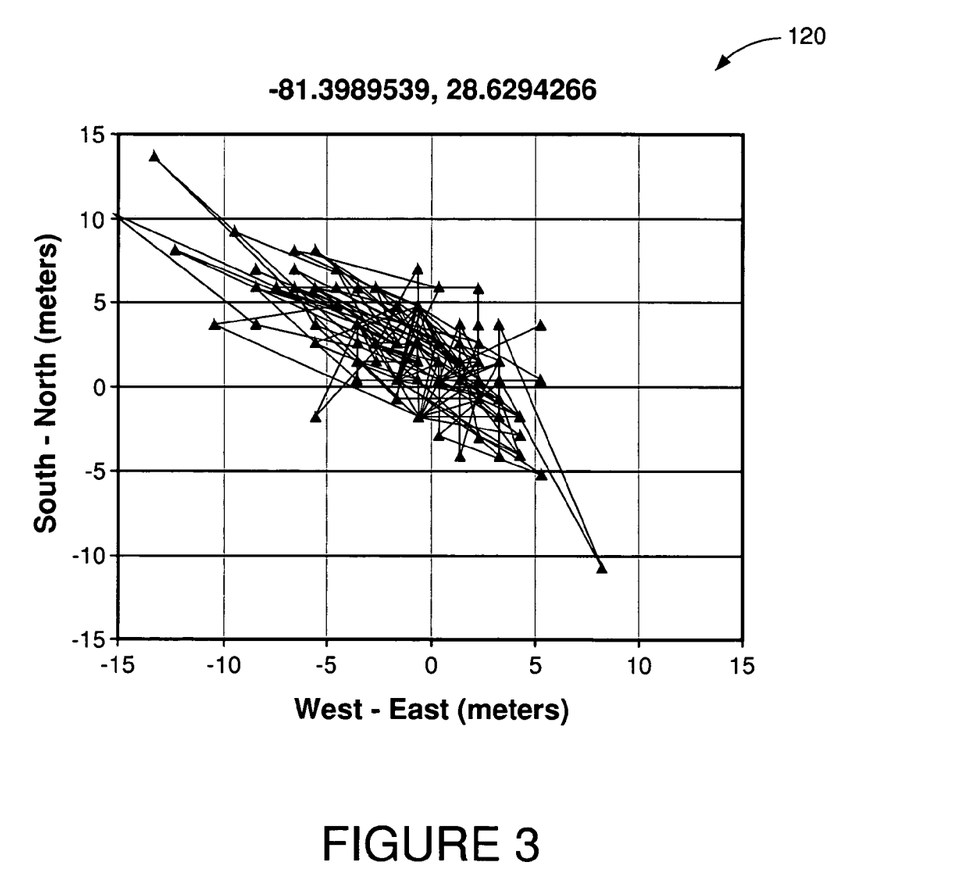
FIG. 3 is a plot illustrating an example of reported positions of a subscriber device in an ad-hoc wireless communications network as shown in FIG. 1.
Figure 4:
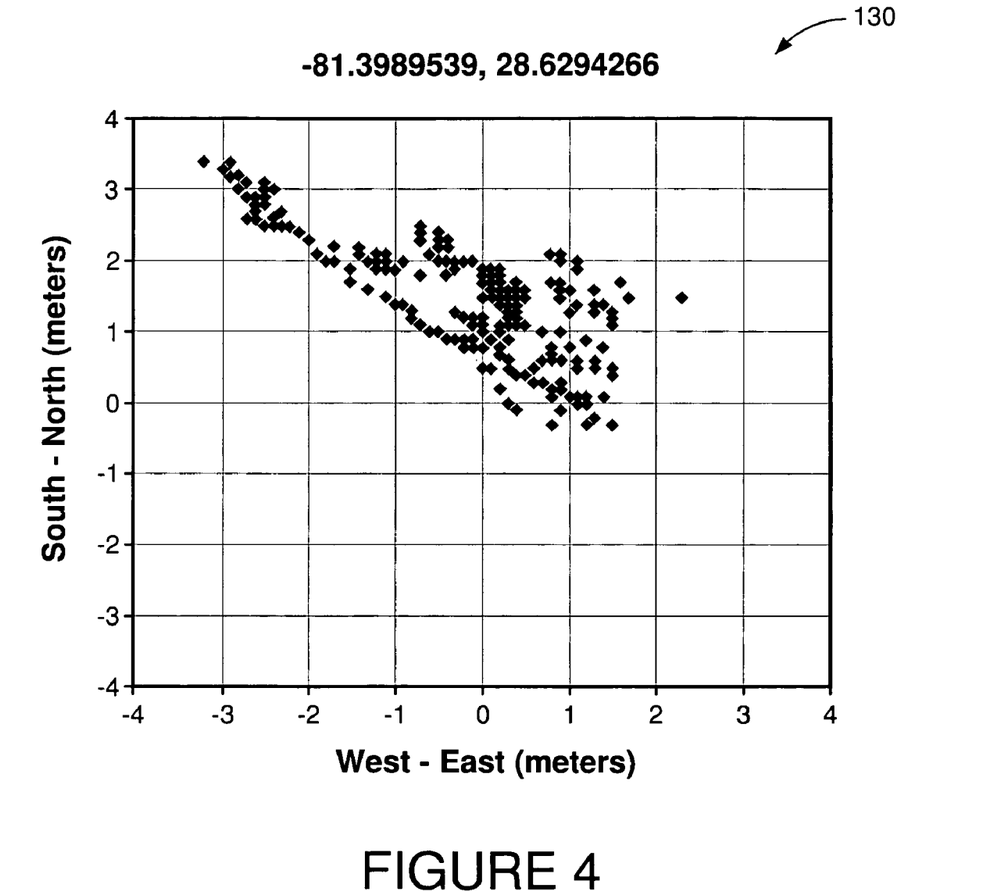
FIG. 4 is a plot illustrating an example of values shown in FIG. 3 which have been filtered by a predictive filter according to an embodiment of the present invention.
Figure 5:
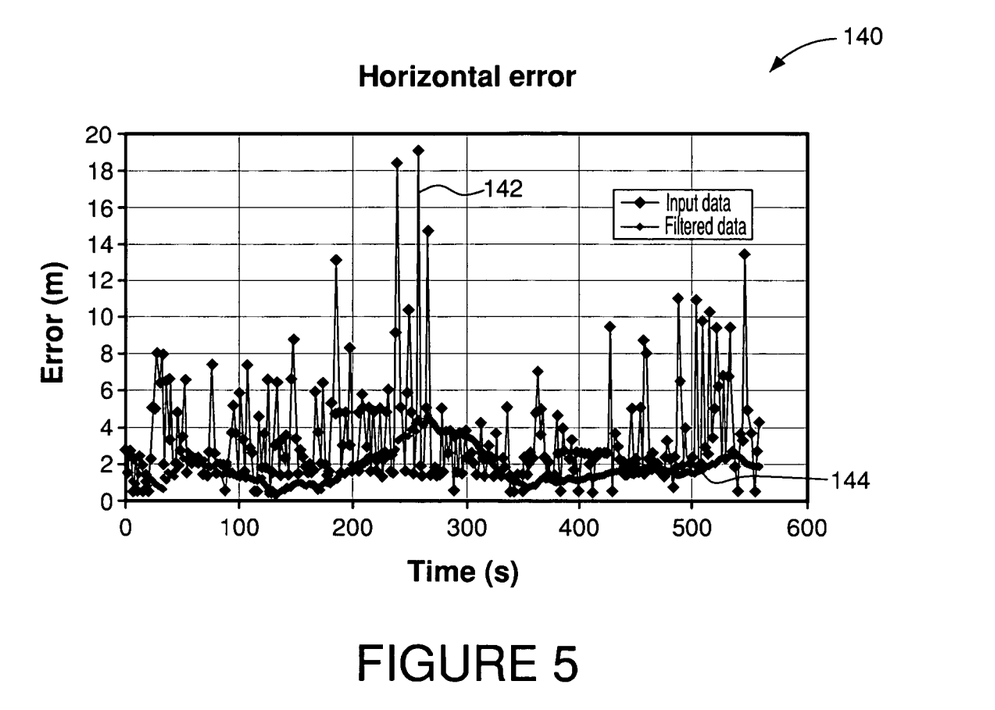
FIG. 5 is a plot illustrating an example of the time variation of the filter precision in accordance with an embodiment of the present invention.

Implementation of an embodiment of the present invention in an ad-hoc network can be illustrated as shown in FIGS. 3, 4 and 5. FIG. 3 illustrates reported positions of a subscriber device on a geographic plot 120. A set of 281 samples were collected from a point inside a building at a rate of one sample every 2 seconds and reported as shown in FIG. 3. The plot of FIG. 3 shows all measurements that were enclosed within a 25×25 square meter area. The results of filtering this data with a KFilter to improve accuracy as described above is presented in FIG. 4, which illustrates examples of the filtered values shown in FIG. 3 on a geographic plot 130.

The standard deviation of errors for the unfiltered data of FIG. 3 is, $\sigma_x$=3.1;
$\sigma_y$=2.6;
$\sigma_z$=0.5; and
$\sigma$=4.1.

After filtering as shown in FIG. 4, the standard deviation of errors is, $\sigma_x$=1.2;
$\sigma_y$=0.8;
$\sigma_z$=0.1; and
$\sigma$=1.4.

This data shows an improvement in three dimensional (3D) data precision by a factor of 3. In FIG. 4, the filtered values, or filtered positions, are shown covering an area of about 4×4 square meters, showing much better dispersion than raw data.

The improved results achieved using the embodiment of the present invention described above, are more clearly shown in FIG. 5. The chart 140 in FIG. 5 shows the precision of the subscriber device position provided by the standard location services operations compared with the filtered data using the system and method of the present invention described above. As shown, the plot of input data 142 has a much greater cumulative degree of error when compared to the filtered data of 144. In the example presented, the collected data has very small errors at the beginning, which allowed the KFilter to converge fast and provide very accurate precision after collecting only 6 samples. In other examples, larger errors can also be eliminated in a similar fashion.

Although only a few exemplary embodiments of the present invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

What is claimed is:

1. A method for determining a location of a mobile communication device in a communication network, the method comprising:
   estimating a location of the mobile communication device based on measured data representing respective distances between the mobile communication device and a plurality of reference points;
   assigning a respective weight factor to each data of the measured data;
   generating a forget factor based on the respective weight factors; and
   modifying the estimated location, using a predictive filter including the forget factor which treats older measured data less significantly than newer measured data in estimating the location, to generate a modified estimated location representative of the location of the mobile communication device.

2. The method as claimed in claim 1, wherein:
   the modifying step predicts movement of the mobile communication device on three axes of coordinates and uses the predictive filter to adjust the predicted movement to ascertain the modified estimated location.

3. The method as claimed in claim 2, wherein:
   the modifying step predicts the movement using equations including variables representing the starting position of the mobile communication device and variables representing the moving speed of the mobile communication device, as modified by the predictive filter.

4. The method as claimed in claim 1, wherein:
   the network includes a wireless multihopping communication network, and the mobile communication device is a node in the wireless multihopping communication network.

5. The method as claimed in claim 1, wherein:
   the mobile communication device performs the estimating and modifying steps.

6. The method as claimed in claim 1, wherein:
   the forget factor has a value between 0 and 1.

7. A method for determining a location of a mobile communication device in a communication network, the method comprising:

estimating a location of the mobile communication device based on measured data representing respective distances between the mobile communication device and a plurality of reference points;

modifying the estimated location, using a predictive filter including a forget factor which treats older measured data less significantly than newer measured data in estimating the location, to generate a modified estimated location representative of the location of the mobile communication device;

wherein:

the modifying step predicts movement of the mobile communication device on three axes of coordinates and uses the predictive filter to adjust the predicted movement to ascertain the modified estimated location;

the modifying step predicts the movement using equations including variables representing the starting position of the mobile communication device and variables representing the moving speed of the mobile communication device, as modified by the predictive filter; and the equations include three systems of equations, each system pertaining to a respective axis of movement and employing the forget factor to adjust the estimated starting position coordinate for that respective axis and speed of movement along that respective axis.

8. A computer readable medium of instructions for enabling a processor to determine a location of a mobile communication device in a communication network, the computer readable medium of instructions comprising:

a first set of instructions, adapted to control the processor to estimate a location of the mobile communication device based on measured data representing respective distances between the mobile communication device and a plurality of reference points; and a second set of instructions, adapted to control the processor to modify the estimated location, using a predictive filter including a forget factor which treats older measured data less significantly than newer measured data in estimating the location, to generate a modified estimated location representative of the location of the mobile communication device;

wherein the second set of instructions is further adapted to control the processor to assign a respective weight factor to each data of the measured data, and to generate the forget factor based on the assigned weight factors.

9. The computer readable medium of instructions as claimed in claim 8, wherein:

the second set of instructions is adapted to control the processor to predict movement of the mobile communication device on three axes of coordinates and uses the predictive filter to adjust the predicted movement to ascertain the modified estimated location.

10. The computer readable medium of instructions as claimed in claim 9, wherein:

the second set of instructions is adapted to control the processor to predict the movement using equations including variables representing the starting position of the mobile communication device and variables representing the moving speed of the mobile communication device, as modified by the predictive filter.

11. The computer readable medium of instructions as claimed in claim 8, wherein:

the network includes a wireless multihopping communication network, and the mobile communication device is a node in the wireless multihopping communication network.

12. The computer readable medium of instructions as claimed in claim 8, wherein:

the processor is employed at the mobile communication device to perform the estimating and modifying operations.

13. The computer readable medium of instructions as claimed in claim 8, wherein:

the forget factor has a value between 0 and 1.

14. A computer readable medium of instructions for enabling a processor to determine a location of a mobile communication device in a communication network, the computer readable medium of instructions comprising:

a first set of instructions, adapted to control the processor to estimate a location of the mobile communication device based on measured data representing respective distances between the mobile communication device and a plurality of reference points; and a second set of instructions, adapted to control the processor to modify the estimated location, using a predictive filter including a forget factor which treats older measured data less significantly than newer measured data in estimating the location, to generate a modified estimated location representative of the location of the mobile communication device;

wherein:

the second set of instructions is adapted to control the processor to predict movement of the mobile communication device on three axes of coordinates and uses the predictive filter to adjust the predicted movement to ascertain the modified estimated location;

the second set of instructions is adapted to control the processor to predict the movement using equations including variables representing the starting position of the mobile communication device and variables representing the moving speed of the mobile communication device, as modified by the predictive filter; and the equations include three systems of equations, each system pertaining to a respective axis of movement and employing the forget factor to adjust the estimated starting position coordinate for that respective axis and speed of movement along that respective axis.

15. A system for determining a location of a mobile communication device in a communication network, the system comprising:

a processor, adapted to estimate a location of the mobile communication device based on measured data representing respective distances between the mobile communication device and a plurality of reference points, and being further adapted to assign a respective weight factor to each data of the measured data, generate the forget factor based on the assigned weight factors, and modify the estimated location, using a predictive filter including the forget factor which treats older measured data less significantly than newer measured data in estimating the location, to generate a modified estimated location representative of the location of the mobile communication device.

16. The system as claimed in claim 15, wherein:

the modifying operation predicts movement of the mobile communication device on three axes of coordinates and uses the predictive filter to adjust the predicted movement to ascertain the modified estimated location.

17. The system as claimed in claim 16, wherein:

the modifying operation predicts the movement using equations including variables representing the starting position of the mobile communication device and variables representing the moving speed of the mobile communication device, as modified by the predictive filter.

18. The system as claimed in claim 15, wherein:
the network includes a wireless multihopping communication network, and the mobile communication device is a node in the wireless multihopping communication network.

19. The system as claimed in claim 15, wherein:
the mobile communication device includes the processor that performs the estimating and modifying operations.

20. The system as claimed in claim 15, wherein:
the forget factor has a value between 0 and 1.

21. A system for determining a location of a mobile communication device in a communication network, the system comprising:
a processor, adapted to estimate a location of the mobile communication device based on measured data representing respective distances between the mobile communication device and a plurality of reference points, and being further adapted to modify the estimated location, using a predictive filter including a forget factor which treats older measured data less significantly than newer measured data in estimating the location, to generate a modified estimated location representative of the location of the mobile communication device;

wherein:

the modifying operation predicts movement of the mobile communication device on three axes of coordinates and uses the predictive filter to adjust the predicted movement to ascertain the modified estimated location;

the modifying operation predicts the movement using equations including variables representing the starting position of the mobile communication device and variables representing the moving speed of the mobile communication device, as modified by the predictive filter; and the equations include three systems of equations, each system pertaining to a respective axis of movement and employing the forget factor to adjust the estimated starting position coordinate for that respective axis and speed of movement along that respective axis.

* * * * *